May 31, 1960   G. J. BRUECKER   2,938,497
FEED DISPENSING SILO
Filed July 28, 1958
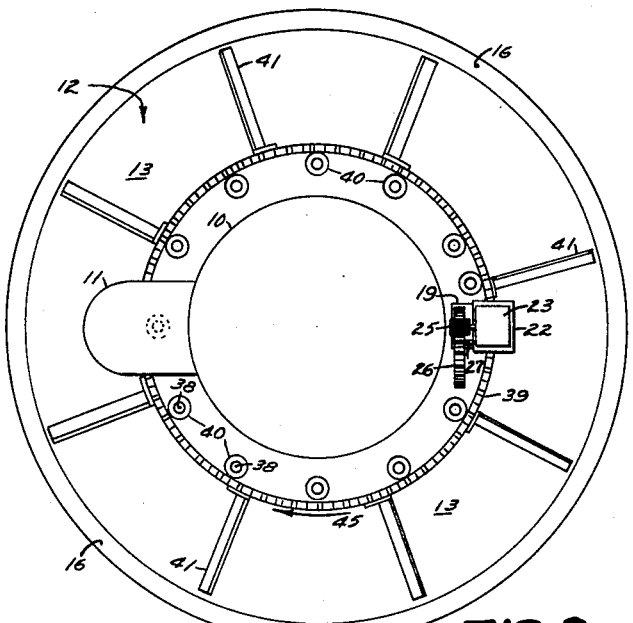
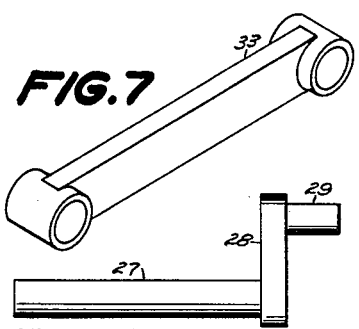
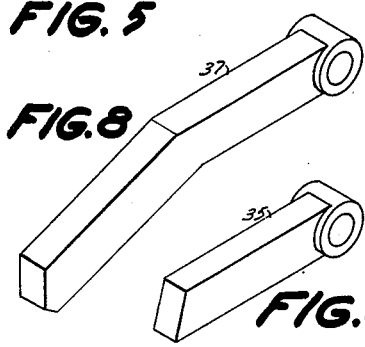
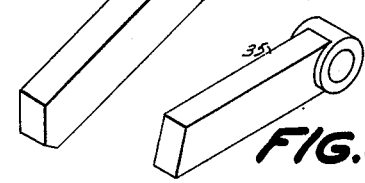
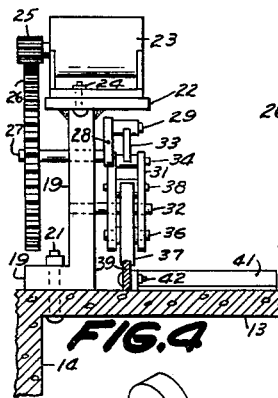
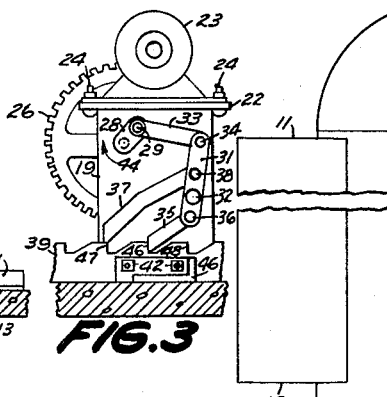
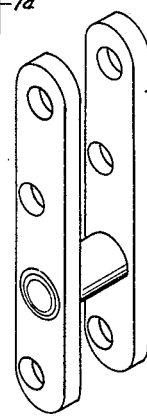
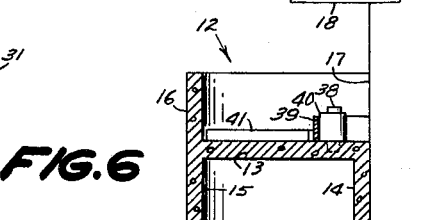
INVENTOR.
GERALD J. BRUECKER
BY
ATTORNEY 2,938,497

FEED DISPENSING SILO

Gerald J. Bruecker, Holland, Wis., assignor to Badger Northland, Inc., Kaukauna, Wis., a corporation of Wisconsin Filed July 28, 1958, Ser. No. 751,243

10 Claims. (Cl. 119—52)

This invention relates generally to feed storage silos and more particularly to a feed storage silo having ratchet driven distributing means associated with said silo.

The purpose of this invention is to provide a novel, simple, inexpensive and efficient silo feed distributor.

An object of this invention is the provision of a novel silo feed distributor incorporating ratchet drive means.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 1 is an elevation view, partly in section, of the invention;

Fig. 2 is a full plan view of the invention shown in Fig. 1;

Fig. 3 is an enlarged fragmentary view taken along line 3—3 of Fig. 1;

Fig. 4 is a side elevation view of Fig. 3;

Fig. 5 illustrates an enlarged view of a crank shaft embodied in the invention;

Fig. 6 is a prespective view illustrating a rocker arm embodied in the invention;

Fig. 7 is a prespective view illustrating a connecting rod embodied in the invention;

Fig. 8 is a perspective view illustrating a long ratchet dog embodied in the invention;

Fig. 9 is a perspective view illustrating a short ratchet dog embodied in the invention; and Fig. 10 is an enlarged fragmentary view of a ratchet ring gear embodied in the invention.

Referring now to the drawings, wherein like reference characters designate like or corresponding parts throughout the several views, there is shown a conventional ensilage silo 10 having a vertical chute 11 built over the usual longitudinal slot having removable panels (not shown). The chute originates at the top of the silo, and extends downwardly to guide ensilage from the silo into an annular feed trough generally indicated at 12 that surrounds the silo.

The feed trough comprises an annular deck 13 surrounding the silo with its inner periphery disposed against the outer periphery of the silo.

Said deck is supported by a pair of spaced coaxial cylindrical supports or legs 14 and 15, leg 14 being disposed against the silo, and leg 15 being uniformly spaced from the silo and disposed adjacent the outer edge of said annular deck.

A low cylindrical side wall 16, spaced from the silo and mounted on deck 13 along its outer edge, forms the outer wall of said trough 12. The deck 13 forms the bottom of the trough; and the adjacent silo wall portion 17 serves as the remaining or inner wall of the annular trough. Said feed trough is of a height suitable for cattle to feed therefrom.

The discharge opening 18 of the chute 11 is disposed above the feed trough 12 thereby associating the discharge opening with the trough whereby the chute discharges directly into the feed trough 12.

A supporting base 19 is mounted in the trough 12, adjacent the silo, as by means of bolt 21. On said base is mounted a platform 22 secured thereto as by welding. See Figs. 1 and 4.

Low speed motor means, or a gear motor means having built-in reduction gear means, such as indicated at 23, is mounted on said platform by means of bolts 24. Said motor means is also known as "means for driving."

On the shaft of said motor there is mounted rotatively-rigid a pinion 25 enmeshed with a spur gear 26 which in turn is mounted rotatively-rigid on a crank shaft 27 journalled in the base 19. Said crankshaft comprises a web 28 and crank pin 29 projecting therefrom. See Figs. 1, 4 and 5.

A rocker arm 31, most clearly shown in Figs. 4, 5 and 6, is rotatably mounted on fixed shaft 32 mounted in base 19, and is connected to the crank pin 29 through means of connecting rod 33 and wrist pin 34. Said connecting rod communicates the circular motion of the crankshaft to the rocker arm as reciprocating motion, causing the rocker arm to oscillate to and fro.

A short ratchet dog 35 is pivotally connected to the lower end portion of rocker arm 31 through means of pin 36.

A long ratchet dog 37 is pivotally connected to the rocker arm 31, intermediate the wrist pin 34 and fixed shaft 32, through means of pin 38.

Said ratchet dogs are operative to alternately engage the teeth of a ratchet ring gear 39 disposed coaxially around the silo 10 and which rests on the bottom 13 of trough 12. Said ring gear 39, also known as annular drive means, is maintained spaced from the silo wall through means of a plurality of circumferentially disposed rollers, such as indicated at 40, rotatably mounted on equally spaced fixed shafts 38 vertically embedded in the bottom 13 of trough 12. Said rollers minimize the friction as the ring gear is driven around the silo, and guide the ring gear circumferentially about its own axis.

A plurality of equally spaced flights 41 are fixed on said ring gear through means of bolts 42. Said bolts are directed through apertures 43 in the ring gear. The flights rest on the bottom 13 of the trough 12, and are operative to propel and distribute feed delivered to the trough 12 from the chute 11.

Operation: Ensilage feed removed from the silo, either manually or mechanically, is pitched or fed into chute 11 and directed downwardly therein to discharge opening 18, and thence outwardly therefrom into feed trough 12. As the feed accumulates in the trough, under the discharge opening of the chute, it is propelled and distributed around the trough by the plurality of slowly moving flight means 41. The flights move slowly so as not to inconvenience the cattle as they feed from the trough.

The flights are driven through driving means initiating with motor 23. The motor 23 drives crankshaft 27 through means of pinion 25 and spur gear 26.

The rocker arm 31 is reciprocated through means of a connecting rod 33 connected to crank pin 29.

As the rocker arm 31 is oscillated to and fro on pin 32, dogs 35 and 37 alternately engage teeth on ring gear 39 and propel it clockwise around in the direction of arrow 45, Fig. 2. This double-action arrangement of ratchet dogs provides two impulses of movement to the ring gear per cycle of rocker arm.

As the lower short dog 35 is operatively propelling the ring gear forwardly, through means of tooth 46, the upper long dog 37 is being retracted to an operable position behind an engageable tooth 47 on the ring gear. When the lower short dog 35 reaches its maximum forward position, the upper long dog is moved to its maximum rearward position and behind tooth 47, ready for engagement therewith, see Fig. 3.

As the upper long dog drives forwardly and engages and drives tooth 47 forwardly, lower short dog 35 is being retracted to an operable position behind tooth 48. When the upper long dog 37 reaches its maximum forward position, the lower short dog 35 is retracted to its maximum rearward position behind tooth 48, and the cyclic operations thereof repeat.

The ring gear teeth, such as teeth 46, 47, 48, are set in the rim of the ring gear and at right angle to its plane.

Some characteristic features of this invention are the provision of an ensilage distributor embodying ratchet drive means; the provision of a ratchet ring gear extending around the feed trough; the provision of flights mounted directly on said ratchet ring gear; and the provision of a simple, inexpensive and efficient silo feed distributor.

Obviously, many modifications and variations of the present invention are possible in the light of the above teachings. It is therefore to be understood, that within the scope of the appended claims, the invention may be practised otherwise than as specifically described.

What is claimed and desired to be protected by Letters Patent of the United States is:

1. A feed distributing silo, comprising: a silo having a discharge opening; annular feed trough means adjacent to and surrounding said silo, for receiving material from said discharge opening, said trough means having a bottom and inner and outer side walls; revolvable ring gear means surrounding said silo and slidably mounted on said bottom and disposed coaxially with said annular feed trough and adjacent said inner wall, said ring gear means having engageable teeth set in its rim at right angle to its plane; vertically disposed pin means mounted on said trough bottom inwardly of said ring gear; roller means rotatably mounted on said pin means and rollably engageable with the inner periphery of said ring gear means for guiding said ring gear means circumferentially about its axis; flight means projecting outwardly from said ring gear means and slidably engageable on said bottom, for engaging and propelling material in said trough means; support means mounted on said bottom between said ring gear means and said inner wall; rocker arm means pivotally mounted intermediate its ends on said support means, said rocker arm means disposed to oscillate over and along said rim, and having an upper end portion and lower end portion relative to the rocker arm means pivot; short ratchet dog means pivotally mounted on the lower end portion of said rocker arm means, drivingly engageable with the teeth on said ring gear means; long ratchet dog means pivotally mounted on the upper end portion of said rocker arm means, drivingly engageable with teeth on said ring gear means; and drive means on said support means for oscillating said rocker arm means to and fro; whereby said dog means are alternately engaged with teeth on said ring gear means and drive said ring gear means and associated flight means progressively around said annular feed trough means.

2. A feed distributing silo, comprising: a silo having a discharge opening; feed trough means disposed around said silo to receive material from said discharge opening; annular gear means, having engageable teeth means thereon, disposed in said feed trough means slidably mounted on the bottom thereof and extending therealong, and revolvable therein; guide means, engageable with the inner periphery of said annular gear means, for guiding said annular gear means along said feed trough means; flight means on said annular gear means, extending outwardly therefrom, for engaging and propelling material in said feed trough means; pivotally mounted arm means disposed to oscillate along said annular gear means; dog means pivotally mounted on said arm means, drivingly engageable with said teeth means; and drive means for oscillating said arm means; whereby said dog means periodically engage said teeth means and drive said annular gear means and associated flight means around said feed trough means.

3. A feed distributing silo, comprising: a silo having a discharge opening; annular feed trough means, having an inner wall and a bottom, disposed to receive material from said discharge opening; endless gear means, having engageable teeth means thereon, disposed in and along said feed trough means adjacent said inner wall and slidably mounted on said bottom and revolvable therearound; flight means on said endless gear means, projecting outwardly thereof, for engaging and propelling material in said feed trough means; pivotally mounted arm means disposed to oscillate along said endless gear means; dog means pivotally mounted on said arm means and drivingly engageable with said teeth means; and drive means for oscillating said arm means; whereby said dog means engage said teeth means and drive said endless gear means and associated flight means in successive stages around said feed trough means.

4. A distributing apparatus, comprising: annular feed trough means, said trough means having a bottom and inner and outer side walls; revolvable ring gear means slidably mounted on said bottom and disposed coaxially with said annular trough means and adjacent said inner wall, said ring gear means having engageable teeth means set in its rim at right angle to its plane; guide means mounted on said trough bottom, engageable with the inner periphery of said ring gear means, for guiding said ring gear means circumferentially about its axis; flight means on said ring gear means, projecting outwardly therefrom, and slidably engageable on said trough bottom, for engaging and propelling material in said trough means; support means mounted on said trough bottom, between said ring gear means and said inner wall; rocker arm means pivotally mounted intermediate its ends on said support means; said rocker arm means disposed to oscillate above and along the ring gear rim, and having an upper end portion and lower end portion relative to the rocker arm means pivot; short ratchet dog means pivotally mounted on the lower end portion of said rocker arm means, drivingly engageable with teeth on said ring gear means; long ratchet dog means pivotally mounted on the upper end portion of said rocker arm means, drivingly engageable with the teeth means on said ring gear means; and drive means on said support means for oscillating said rocker arm means to and fro; whereby said dog means alternately engage the teeth means on said ring gear means and drive said ring gear means and associated flight means progressively around said annular feed trough means.

5. A distributing apparatus, comprising: annular feed trough means having a bottom and inner and outer side walls; annular gear means, having engageable teeth means thereon, disposed in said feed trough means adjacent said inner side wall on the bottom thereof and extending therearound and revolvable therein; guide means, engageable with said annular gear means, for guiding said annular gear means around said annular feed trough means; flight means extending outwardly of said annular gear means for engaging and propelling material in said annular feed trough means; pivotally mounted arm means disposed to oscillate along said annular gear means; dog means pivotally mounted on said arm means, drivingly engageable with said teeth means; and drive means for oscillating said arm means; whereby said dog means periodically engage said teeth means and drive said annular gear means and associated flight means around said annular feed trough means.

6. A distributing apparatus, comprising: annular trough means having a bottom and inner and outer side walls; endless gear means, having engageable teeth means thereon, slidably mounted on said trough bottom and disposed adjacent said inner side wall and along the length of said trough means and revolvable therearound; flight means extending from the outer side only of said endless gear means, for engaging and propelling material in said trough means, said flight means being slidably engageable on said trough bottom; pivotally mounted arm means disposed to oscillate along said endless gear means; dog means pivotally mounted on said arm means and drivingly engageable with said teeth means; and drive means for oscillating said arm means; whereby said dog means engage said teeth means and drive said endless gear means and associated flight means in successive stages around said annular trough means.

7. A distributing apparatus, comprising: annular feed trough means having a bottom inner and outer side walls; endless gear means, having engageable teeth means thereon, slidably mounted on said trough bottom and disposed in and along said annular feed trough means adjacent said inner side wall and revolvable therearound; flight means extending from the outer side only of said endless gear means, for engaging and propelling material in said annular feed trough means, said flight means being slidably engaged on said trough bottom; reciprocable means disposed to reciprocate along said endless gear means; dog means on said reciprocable means operative to drivingly engage said teeth means when traveling in one direction and inoperatively retracted therefrom when traveling in the opposite direction; and drive means for actuating said reciprocable means.

8. A distributing apparatus, comprising: annular trough means having a bottom and an inner side wall; a ring gear slidably mounted on the bottom of said annular trough means adjacent said inner side wall; flight means connected to said ring gear for engaging material in said annular trough means; and means engageable with the teeth of said ring gear for driving said ring gear along said annular trough means.

9. A distributor apparatus, comprising: annular trough means having a bottom and an inner side wall; a ring gear slidably mounted on the bottom of said annular trough means adjacent said inner side wall; flight means slidably mounted on the bottom of said annular trough means and connected to said ring gear; and means engageable with teeth on said ring gear for driving said ring gear along said annular trough means.

10. A feed distributing silo, comprising: a silo; annular trough means disposed to receive material from said silo, said annular trough means having a bottom; a ring gear slidably mounted on said bottom and disposed substantially coaxially thereof; flight means connected to said ring gear means for engaging material in said trough; means for driving said ring gear along said annular trough means; and guide means engaging said ring gear for guiding said ring gear around said trough means.

References Cited in the file of this patent

UNITED STATES PATENTS

| | | |
|---|---|---|
| 915,306 | Oswald | Mar. 16, 1909 |
| 2,683,439 | Markey | July 13, 1954 |
| 2,747,546 | Winter | May 29, 1956 |